US006663044B1

United States Patent
Munoz et al.

(10) Patent No.: US 6,663,044 B1
(45) Date of Patent: Dec. 16, 2003

(54) VAPOR COMPRESSION CYCLE ENVIRONMENTAL CONTROL SYSTEM

(75) Inventors: Jules Ricardo Munoz, Vernon, CT (US); Luca Bertuccioli, Enfield, CT (US); Michael K. Sahm, Avon, CT (US); Jay Fletcher, Marlborough, CT (US); Charles E. Lents, Amston, CT (US); Richard Welch, Rockford, IL (US); Steve Squier, Rockford, IL (US); Arthur Chris Becker, Andover, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 10/251,719

(22) Filed: Sep. 20, 2002

Related U.S. Application Data
(60) Provisional application No. 60/323,894, filed on Sep. 20, 2001.

(51) Int. Cl.[7] .............................................. B64D 11/00
(52) U.S. Cl. .................... 244/118.5; 62/172; 62/93; 62/87; 62/402; 60/39.07; 60/366
(58) Field of Search ................ 244/118.5; 62/172, 62/93, 86, 87, 402; 60/39.02, 39.07, 266

(56) References Cited

U.S. PATENT DOCUMENTS

| 5,918,472 A | * | 7/1999 | Jonqueres ...................... 62/87 |
| 5,956,960 A | * | 9/1999 | Niggeman .................... 62/172 |
| 6,128,909 A | * | 10/2000 | Jonqueres ...................... 62/87 |
| 6,182,435 B1 | * | 2/2001 | Niggemann et al. .......... 60/772 |
| 2002/0166923 A1 | * | 11/2002 | Munoz et al. ........... 244/118.5 |

* cited by examiner

*Primary Examiner*—J. Woodrow Eldred
(74) *Attorney, Agent, or Firm*—Bachman & Lapointe, P.C.

(57) ABSTRACT

The present invention relates to a vapor compression cycle environmental control system for use on aircraft. The system includes an environmental control subsystem which supplies pressurized ram air at a desired temperature to the aircraft's flight deck and/or cabin. The environmental control subsystem uses a vapor compression cycle subsystem to provide the ram air at the desired temperature. The system further includes an air turbine driven by engine bleed air to provide power to an aircraft mounted accessory drive and to provide heated air to an anti-ice system. The aircraft mounted accessory drive provides power to an air compressor which forms part of the environmental control subsystem and to a working fluid compressor which forms part of the vapor compression cycle subsystem.

21 Claims, 2 Drawing Sheets

VAPOR COMPRESSION CYCLE ENVIRONMENTAL CONTROL SYSTEM

CROSS REFERENCE TO RELATED APPLICATION(S)

This application claims the benefit of U.S. Provisional Patent Application Ser. No. 60/323,894, entitled VAPOR COMPRESSION CYCLE ENVIRONMENTAL CONTROL SYSTEM, filed Sep. 20, 2001.

BACKGROUND OF THE INVENTION

The present invention relates to an air turbine driven environmental control system for an aircraft.

Aircraft power systems are comprised of several major subcomponents such as the engine, the environmental control system, anti-icing systems, and thermal management systems. Typically, these subsystems are designed relatively independently of one another with power being transferred from one subsystem to another in certain predefined ways.

The purpose of an aircraft environmental control system is to supply cooled pressurized air to the cabin and flight deck. This is typically accomplished by the use of an air cycle machine. FIG. 1 illustrates a typical environmental control system 10 for an aircraft. Depending upon the mission point, bleed air from the engine 12 is removed from either the mid- or high-pressure stages of the high compressor 14. The bleed air is first cooled by ram air in a primary heat exchanger. The bleed air is then further compressed in the compressor section 16 of the air cycle machine. Additional cooling of the bleed air is performed in a secondary heat exchanger 18 again using ram air as the coolant. The bleed air is then expanded to the desired pressure across the turbine section 20 of the air cycle machine. The expansion process produces the necessary work required to drive the compressor 16 via shaft 22 and significantly drops the temperature of the bleed air. The cooled bleed air exiting the turbine section 20 is mixed with cabin recirculation air to maintain the temperature of the air entering the cabin at a given level.

One of the deficiencies of this type of system is the penalties which it creates with respect to engine losses. The engine bleed air used for this system could be as much as 5% of the core flow from the engine. Other deficiencies include the weight which is added as a result of having to provide one or more heat exchangers. Still further, the system does not address the issue of providing power to or thermally managing other aircraft components.

SUMMARY OF THE INVENTION

Accordingly, it is an object of the present invention to provide an improved environmental control system for an aircraft.

It is a further object of the present invention to provide an environmental control system as above which also provides power to other aircraft components.

The foregoing objects are attained by the environmental control system of the present invention.

In accordance with the present invention, an improved environmental control system is disclosed. The environmental control system broadly comprises means for using bleed air from an engine to provide power to an aircraft mounted accessory drive and to provide improved anti-icing capabilities and means for supplying cooled pressurized ram air to the aircraft flight deck and cabin. The environmental control system in a preferred embodiment has a first subsystem for providing power to an aircraft mounted accessory drive and a second subsystem for supplying pressurized ram air at a desired temperature to at least one of a flight deck and a cabin. The second subsystem includes a vapor compression cycle loop for removing energy from the ram air prior to the ram air being supplied to the at least one of said flight deck and said cabin.

Further, in accordance with the present invention, a method for controlling the environment of an aircraft is provided. The method broadly comprises the steps of providing power from an engine onboard the aircraft to an aircraft mounted accessory drive, supplying pressurized ram air at a desired temperature to at least one of a flight deck and a cabin, providing a vapor compression cycle loop, and removing energy from the ram air using the vapor compression cycle loop prior to supplying the ram air to the at least one of the flight deck and the cabin.

Other details of the environmental control system of the present invention, as well as other objects and advantages attendant thereto, are set forth in the following detailed description and the following drawings in which like reference numerals depict like elements.

DETAILED DESCRIPTION OF THE PREFERRED EMBODIMENT(S)

Figure 2:
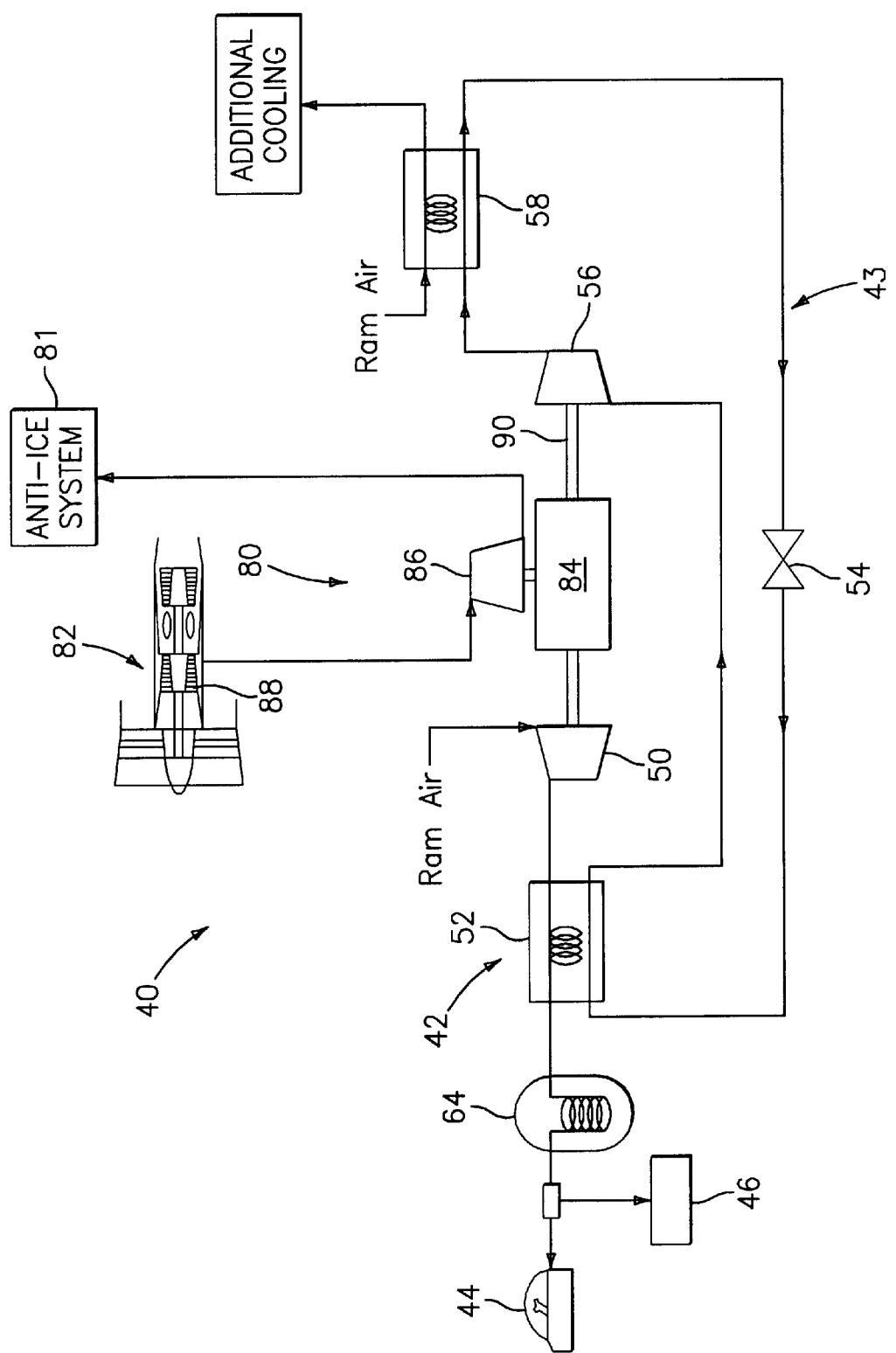
FIG. 2 is a schematic representation of an embodiment of an air turbine driven vapor compression cycle environmental control system in accordance with the present invention.

Referring to FIG. 2, an air turbine driven vapor compression cycle environmental control system 40 in accordance with the present invention is illustrated. The environmental control system 40 includes a first subsystem 80 for using air bled from a propulsion engine 82 to provide. power to an aircraft mounted accessory drive 84 used to supply power to one or more gearboxes, one or more pumps, and/or one or more lubrication systems. The subsystem 80 includes an air turbine 86 which is connected to the accessory drive 84. Bleed air from a high pressure stage of a compressor 88 is fed to the inlet of the air turbine 86. It is advantageous to use bleed air from the high pressure stage because the bleed air then has a high pressure, a high temperature, and high enthalpy. As a result, a higher level of power is delivered and a smaller turbine can be used for the turbine 86. Still further, the turbine 86 can be placed close to the engine 82, thus reducing the need for long runs of pipes or conduits between the engine 82 and the turbine 86. The bleed air causes the turbine 86 to rotate and provide shaft power to the accessory drive 84. The bleed air exiting the turbine 86 is sufficiently warm that it can subsequently be supplied to an aircraft anti-icing system 81.

The aircraft mounted accessory drive 84 is used to supply power to a shaft 90 on which are mounted an air compressor 50 which forms part of an environmental control subsystem 42 and a compressor 56 which forms part of a vapor compression cycle loop 43.

The environmental control subsystem 42 supplies pressurized air at a desired temperature to a flight deck and/or cabin 44 of an aircraft and to an avionics system 46 onboard the aircraft. The environmental control subsystem 42 uses ram air as the source of the air to be delivered to the flight deck and/or cabin 44 and the avionics 46. As can be seen from FIG. 2, the ram air is supplied to the shaft driven air compressor 50. The compressor 50 raises the pressure of the ram air to the necessary pressure for the flight deck and/or cabin 44 and increases the temperature of the ram air. After exiting the compressor 50, the ram air is passed through an evaporator 52 which forms part of the vapor compression cycle loop 43 in which a working fluid, such as a refrigerant, is circulated. In the evaporator 52, energy in the ram air is transferred to the lower temperature working fluid. As a result, the temperature of the ram air is lowered and the temperature of the working fluid is raised.

The cooled pressurized ram air exits the evaporator 52 and flows through a water separator 64 where water/moisture is removed from the ram air. After exiting the water separator 64, the cooled pressurized ram air may be delivered to the flight deck and/or cabin 44. In a preferred embodiment of the system of the present invention, a portion of the cooled pressurized ram air is delivered to the onboard avionics system 46.

If desired, the cooled pressurized ram air may be mixed with air recirculated from the flight deck and/or cabin 44 so that the air being delivered to the flight deck and/or cabin 44 is at the right temperature. Any suitable means known in the art, such as a mixing valve or a by pass valve and duct around evaporator 52 (not shown), may be used to mix the cooled pressurized ram air and the recirculated cabin/flight deck air.

The vapor compression cycle subsystem 43 comprises a loop through which the working fluid, such as a refrigerant, is circulated. As previously mentioned, the working fluid passes through the evaporator 52 where the ram air is cooled and the temperature of the working fluid is increased. The working fluid preferably leaves the evaporator 52 as a saturated or superheated vapor. From the evaporator 52, the working fluid flows through compressor 56 where its pressure is raised and then through condenser 58.

In the condenser 58, ram air is used as a heat sink to withdraw heat from the working fluid and to cause the working fluid temperature to drop and the fluid to condense to a saturated or subcooled liquid. The ram air exiting the condenser 58 is preferably used to provide additional cooling and/or ventilation to other aircraft components such as one or more onboard generators and/or other aircraft enclosures.

From the condenser 58, the working fluid is passed to throttling valve 54 where its pressure and temperature are reduced. The fluid leaves valve 54 as a two phase mixture.

As can be seen from the foregoing description, a system has been described which advantageously and efficiently provides (1) pressurized air at a desired temperature to an aircraft's cabin and/or flight deck, (2) heated air to an aircraft's anti-ice system, (3) cooling air to one or more aircraft components, and (4) power to the aircraft mounted accessory drive.

Figure 1:
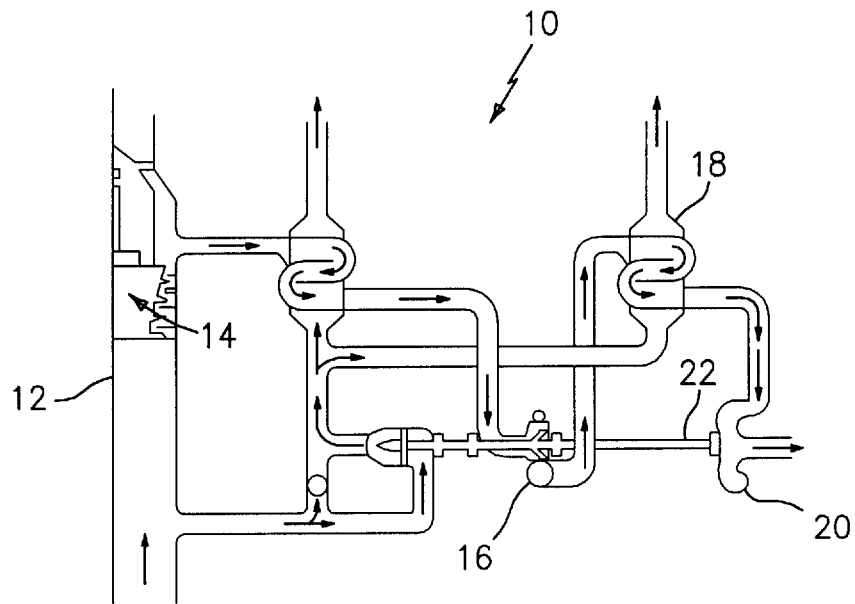
FIG. 1 is a schematic representation of a prior art environmental control system.
Figure 3:
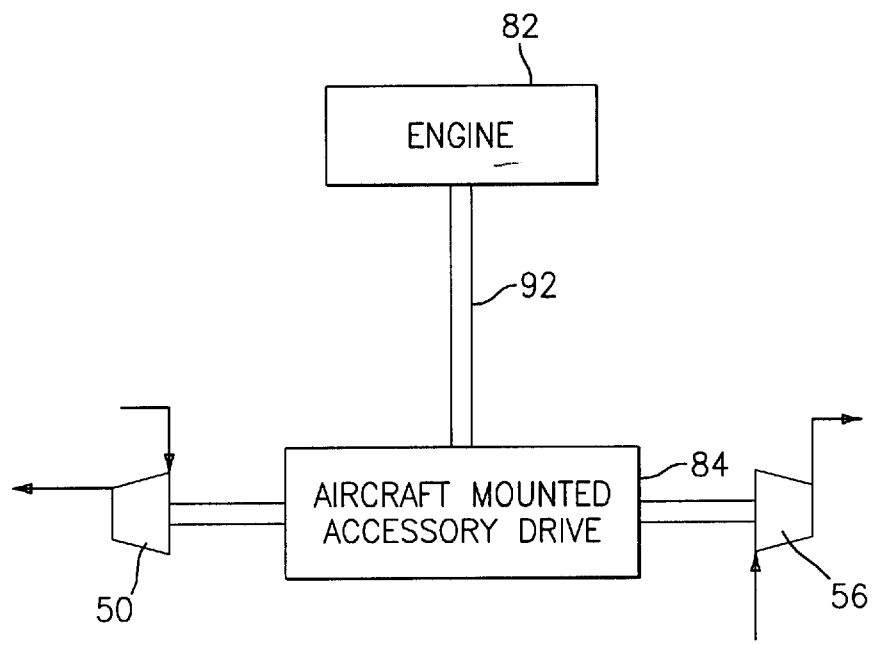
FIG. 3 is a schematic representation of an alternative approach for driving an air turbine in the air turbine driven vapor compression cycle environmental control system of the present invention.

While it is preferred to use engine bleed air as a source of power to drive the aircraft mounted accessory drive 84, engine shaft power could be used in lieu of the engine bleed air if desired as shown in FIG. 3. In such a system, a shaft 92 is used to take power from the engine 82 and drive the aircraft mounted accessory drive 84. Any suitable gearing arrangement known in the art may be used to connect the shaft 92 to a shaft of the engine 82 and to the aircraft mounted accessory drive 84.

Referring again to FIG. 3, the water separator 64 shown in the system may be omitted, if a condenser/reheater assembly is used in the environmental control subsystem 42.

It is apparent that there has been provided in accordance with the present invention a vapor compression cycle environmental control system which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace such alternatives, modifications, and variations as fall within the broad scope of the appended claims.

What is claimed is:

1. An environmental control system for use on an aircraft comprising:

a first subsystem for providing power to an aircraft mounted accessory drive;

said first subsystem comprising a drive turbine connected to said aircraft mounted accessory drive and means for supplying engine bleed air to an inlet of said turbine;

a second subsystem for supplying pressurized ram air at a desired temperature to at least one of a flight deck a cabin; and said second subsystem including a vapor compression cycle loop for removing energy from the ram air prior to said ram air being supplied to the at least one of said flight deck and said cabin.

2. An environmental control system according to claim 1, wherein said means for supplying engine bleed air comprises means for supplying bleed air from a high pressure compressor stage of said engine.

3. An environmental control system according to claim 1, further comprising means for supplying bleed air exiting said turbine to an anti-icing system.

4. An environmental control system according to claim 2, wherein said second subsystem further includes a first compressor mounted to a shaft driven by said aircraft mounted accessory drive and means for delivering ram air to an inlet of said first compressor.

5. An environmental control system according to claim 4, wherein said vapor compression cycle loop includes a second compressor mounted to said shaft driven by said aircraft mounted accessory drive, an evaporator, and a working fluid flowing through said loop.

6. An environmental control system according to claim 5, wherein ram air exiting said first compressor passes through said evaporator so that said energy may be removed from said ram air.

7. An environmental control system according to claim 6, wherein said second subsystem further includes means for removing moisture from said ram air exiting said evaporator.

8. An environmental control system according to claim 7, further comprising means for delivering a portion of said ram air being delivered to said at least one of said flight deck and said cabin to an onbard avionics system.

9. An environmental control system according to claim 5, wherein said vapor compression cycle loop further comprises a condenser for removing heat from said working fluid flowing through said loop.

10. An environmental control system according to claim 9, wherein said condenser uses ram air as a heat sink.

11. An environmental control system according to claim 9, wherein said vapor compression cycle loop further comprises a throttling valve for reducing pressure and temperature of said working fluid.

12. An environmental control system according to claim 5, wherein said working fluid comprises a refrigerant.

13. An environmental control system for use on an aircraft comprising:
- a first subsystem for providing power to an aircraft mounted accessory drive;
- said first subsystem comprising a power transmission means connected to said aircraft mounted accessory drive and a shaft for delivering power from said engine;
- a second subsystem for supplying pressurized ram air at a desired temperature to at least one of a flight deck and a cabin; and
- said second subsystem including a vapor compression cycle loop for removing energy from the ram air prior to said ram air being supplied to the at least one of said flight deck and said cabin.

14. A method for controlling the environment of an aircraft comprising the steps of:
- providing power from an engine onboard said aircraft to an aircraft mounted accessory drive;
- said power providing step comprising providing an air turbine connected to said aircraft mounted accessory drive and supplying bleed air from said engine to an inlet of said air turbine;
- supplying pressurized ram air at a desired temperature to at least one of a flight deck and a cabin;
- providing a vapor compression cycle loop; and
- removing energy from said ram air using said vapor compression cycle loop prior to supplying said ram air to the at least one of said flight deck and said cabin.

15. A method according to claim 14, wherein said bleed air supplying step comprises providing bleed air from a high pressure stage of a compressor.

16. A method according to claim 14, further comprising supplying bleed air exiting said air turbine to an anti-icing system.

17. A method according to claim 14, further comprising:
- providing a first air compressor mounted on a shaft driven by said aircraft mounted accessory drive;
- supplying ram air to an inlet of said compressor;
- said vapor compression cycle loop providing step comprising providing an evaporator as part of said loop; and
- said energy removing step comprises passing said ram air exiting said compressor through said evaporator.

18. A method according to claim 17, further comprising passing air exiting said evaporator through a means for removing moisture from said ram air.

19. A method according to claim 14, further comprising supplying at least a portion of said pressurized ram air to an onboard avionics system to cool said onboard avionics system.

20. A method according to claim 14, wherein said vapor compression cycle loop providing step further comprises providing a second compressor mounted on a shaft driven by said aircraft mounted accessory drive for raising the pressure and temperature of a working fluid flowing through said loop, a condenser for cooling said working fluid and condensing saturated or subcooled liquid, and a throttling valve for reducing the pressure and temperature of the working fluid.

21. A method according to claim 20, wherein said condenser providing step comprises providing a condenser which uses ram air as a heat sink.

* * * * *

UNITED STATES PATENT AND TRADEMARK OFFICE
CERTIFICATE OF CORRECTION

| | |
|---|---|
| PATENT NO. | : 6,663,044 B1 |
| APPLICATION NO. | : 10/251719 |
| DATED | : December 16, 2003 |
| INVENTOR(S) | : Jules Ricardo Munoz et al. |

It is certified that error appears in the above-identified patent and that said Letters Patent is hereby corrected as shown below:

In column 4, claim 1, line 24 after "flight deck" --and-- should be inserted.

In column 4, claim 8, line 57, "onbard" should read --onboard--.

Signed and Sealed this

Fourth Day of September, 2007

JON W. DUDAS
*Director of the United States Patent and Trademark Office*